United States Patent [19]
Kameyama et al.

[11] Patent Number: 6,160,963
[45] Date of Patent: Dec. 12, 2000

[54] FRAME COUNTER DEVICE

[75] Inventors: Nobuyuki Kameyama, Kanagawa; Makoto Isozaki, Tokyo; Hisashi Tasaka, Kanagawa; Kazumi Koike, Kanagawa; Masanori Ishiguro, Kanagawa, all of Japan

[73] Assignee: Fuji Photo Film Co., Ltd., Kanagawa, Japan

[21] Appl. No.: 09/317,940

[22] Filed: May 25, 1999

[30] Foreign Application Priority Data

May 25, 1998 [JP] Japan .................................. 10-142766
May 26, 1998 [JP] Japan .................................. 10-144694

[51] Int. Cl.[7] .................................................... G01B 1/66
[52] U.S. Cl. ........................................ 396/284; 116/213
[58] Field of Search .................................... 396/284, 511, 396/512; 116/213; 235/64.7

[56] References Cited

U.S. PATENT DOCUMENTS

| | | | |
|---|---|---|---|
| 2,401,682 | 6/1946 | French | 116/213 X |
| 2,682,999 | 7/1954 | Grange | 396/284 |
| 2,700,223 | 1/1955 | Stinson | 396/284 |
| 2,917,981 | 12/1959 | Sewig | 116/213 X |
| 2,987,956 | 6/1961 | Planert et al. | 116/213 X |

*Primary Examiner*—W. B. Perkey
*Attorney, Agent, or Firm*—Young & Thompson

[57] ABSTRACT

A frame counter device includes a rotatable counter disk. A train of plural numbers are arranged on one face of the counter disk in an arc shape, and have an outermost point and an innermost point. The outermost point is the farthest from a rotational center of the counter disk and distant from the rotational center by a radius Ro. The innermost point is the nearest to the rotational center and distant from the rotational center by a radius Ri. The radius Ri is 60% or less of the radius Ro.

32 Claims, 15 Drawing Sheets

FRAME COUNTER DEVICE

BACKGROUND OF THE INVENTION

1. Field of the Invention

The present invention relates to a frame counter device for frame counting of photo film. More particularly, the present invention relates to a frame counter device for counting up or down at each time when one frame is exposed on photo film, in which a counted number can be clearly indicated.

2. Description Related to the Prior Art

A camera or a lens-fitted photo film unit incorporates a frame counter device, which counts and indicates the number of frames exposed on photo film or the number of frames remaining unexposed on the photo film. The frame counter device includes a counter disk and a counter window. The counter disk has a train of numbers arranged on its top face in an arc shape. The counter disk is rotated by one step at each time when the photo film is wound by one frame. The counter window renders one number in the train number observable externally. A pointer is printed on the outside of the camera or a cardboard wrapper around the lens-fitted photo film unit, and has a triangular shape or the like to point the center of the window.

The lens-fitted photo film unit includes a housing, which incorporates a simple mechanism for taking exposures. The housing is loaded with an unused photo film cassette in a state where unexposed photo film is entirely drawn from it and provisionally wound in a roll form. When a winder wheel of the lens-fitted photo film unit is rotated after exposing each frame, the photo film is wound into the photo film cassette by a length of one frame. After exposing all available frames, the lens-fitted photo film unit is simply forwarded to a photo laboratory without rewinding operation. The photo film in the lens-fitted photo film unit is subjected to photofinishing, before photo prints are supplied to the user and the photo film being developed is returned to him or her.

There is an IX-240 type of the photo film cassette recently widespread and used in a system referred to as "Advanced Photo System" (trade name). The IX-240 type of the photo film cassette is characterized in its small size. The volume of the IX-240 type of the photo film cassette is 75% as small as that of the conventional 135 type of the photo film cassette. The size of the camera and the lens-fitted photo film unit for use with the IX-240 type of the photo film cassette is reduced. Accordingly, the counter disk has a small size. It is likely that the numbers arranged in the train on the counter disk are very small and difficult for users to recognize exactly and quickly.

In the photo film cassette of the IX-240 type, there is no perforation between a first frame and a leader of the photo film. In the frame counter device of the remainder indicating type, it is likely that there occurs failure in stepwise rotation of the counter disk upon photo film movement after exposing a final frame in the lens-fitted photo film unit. Rotation of the counter disk from the number "1" to the triangular indicia is insufficient. Thus, the completion of the use of the photo film is unclearly indicated to users.

SUMMARY OF THE INVENTION

In view of the foregoing problems, an object of the present invention is to provide a frame counter device in which a counted number for frames of photo film can be clearly indicated.

In order to achieve the above and other objects and advantages of this invention, a frame counter device includes a rotatable counter disk. A train of plural numbers are arranged on one face of the counter disk in an arc shape, have an outermost point and an innermost point, the outermost point being farthest from a rotational center of the counter disk and distant from the rotational center by a first radius, the innermost point being nearest to the rotational center and distant from the rotational center by a second radius, and the second radius being 60% or less of the first radius.

Furthermore, a counter window allows one number in the number train to be externally observed.

The frame counter device is used with photo film, the numbers in the number train are arranged decrementally in one first rotational direction, and at each time when one frame is exposed on the photo film, the counter disk is rotated in a second rotational direction reverse to the first rotational direction, for counting down a number of unexposed frames of the photo film.

The counter disk has a diameter of 20 mm or less.

Furthermore, a transparent cover covers the counter window. A pointer is disposed on the transparent cover, for pointing the one number in the number train.

Furthermore, an upper cover plate covers the counter disk, and has the counter window formed therein.

The numbers in the number train respective have one or two digits, the two digits are arranged in a radial direction of the counter disk, and the innermost point is located at one of the numbers having the two digits.

The frame counter device is incorporated in a lens-fitted photo film unit, the lens-fitted photo film unit includes the upper cover plate and the photo film, the photo film has a predetermined maximum available frame number, and the numbers in the number train are arranged decrementally from the maximum available frame number at a regular difference greater than one.

The number train includes a train of dots, disposed between an edge of the counter disk and the numbers, arranged in an arc shape at a predetermined pitch, one of the dots being set in a predetermined position in the counter window at each time when one frame is exposed.

According to one aspect of the present invention, the numbers include a number 1, and remaining numbers in the number train other than the number 1 are arranged at a predetermined pitch. Furthermore, a borderline indicia is positioned offset in the first rotational direction by the predetermined pitch from a second smallest one of the numbers next to the number 1, and extended in the radial direction of the counter disk. The number 1 has a smaller size than the remaining numbers in the number train other than the number 1, and is disposed in a region defined by the borderline indicia in the second rotational direction. Finish information is indicated in a region defined by the borderline indicia in the first rotational direction, for representing lack of the unexposed frames on the photo film.

The finish information and the number train are different in density or color from one another, and the borderline indicia is defined between the regions different in density or color from one another.

The pointer is finished translucently by mat finish of a portion of the transparent cover.

In a preferred embodiment, the pointer is shaped in a line.

In another preferred embodiment, the pointer includes one or two dots.

According to another aspect of the present invention, a pointer cutout or pointer projection is disposed on the transparent cover, positioned substantially at a center of the counter window, shaped with a curve as viewed in section, for pointing one of numbers in the number train observable in the counter window.

The pointer cutout or pointer projection has a rough surface.

The transparent cover has outer and inner faces, the inner face being positioned at the counter disk. The transparent cover includes a convex lens portion, formed to protrude on the outer face, for enlarging the number train. The pointer cutout or pointer projection is disposed on the inner face.

According to still another aspect of the present invention, at least one pointer groove is disposed on the transparent cover, positioned substantially at a center of the counter window, having a V-shape as viewed in section, for pointing one of numbers in the number train observable in the counter window.

The at least one pointer groove includes a train of plural pointer grooves, the groove train of the pointer grooves extending crosswise to the number train, and the pointer grooves being inclined with reference to extension of the groove train.

In another preferred embodiment, the at least one pointer groove includes first and second groups of plural pointer grooves, the first and second groups being arranged crosswise to the number train, and the pointer grooves being arranged along the number train.

By this construction, a counted number for frames of photo film can be clearly indicated.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1A:
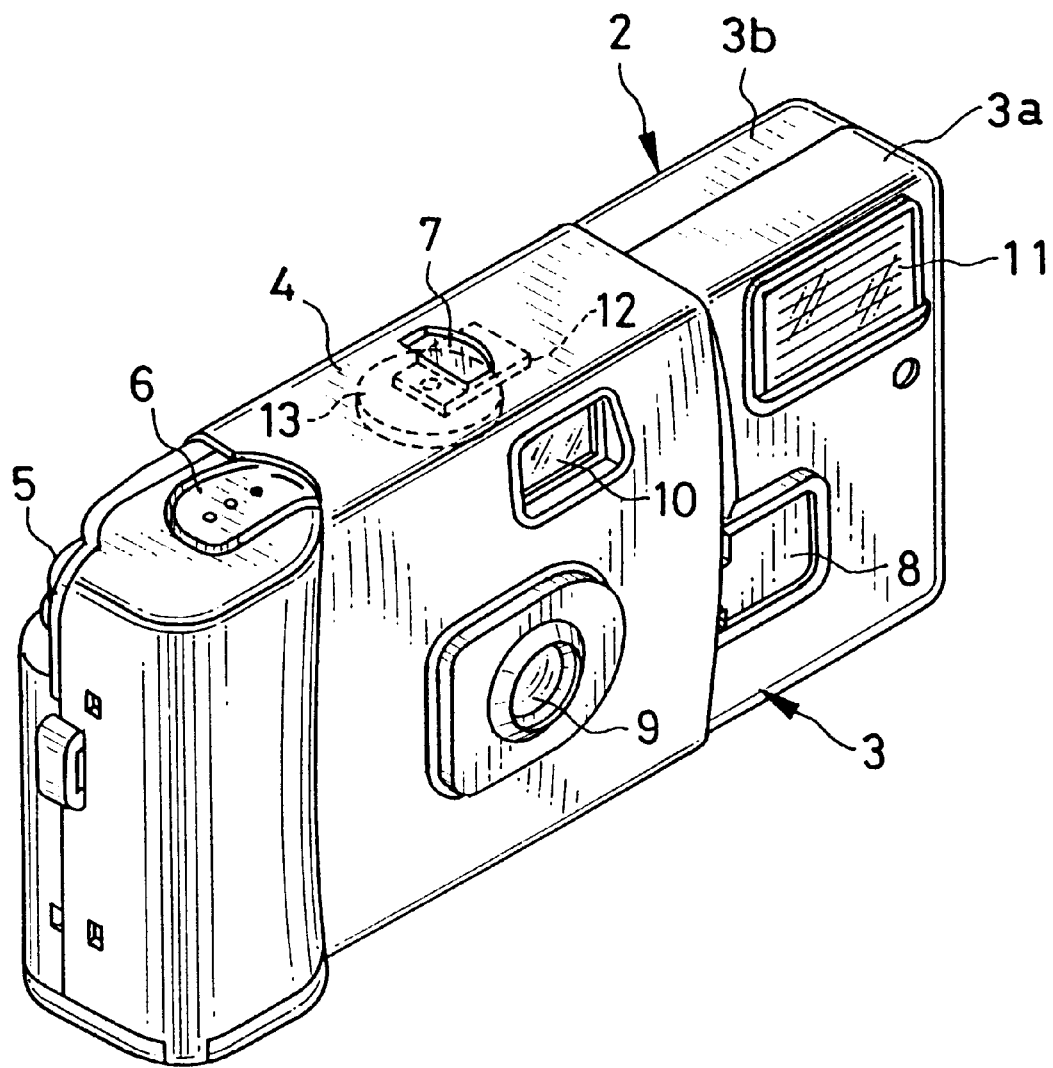
FIG. 1A is a perspective illustrating a lens-fitted photo film unit.

In FIG. 1A, a lens-fitted photo film unit 2 of the present invention is illustrated. The lens-fitted photo film unit 2 is constituted by a housing 3 and a cardboard belt 4. The housing 3 incorporates a simple mechanism for taking exposures. The cardboard belt 4 wraps the center of the housing 3, and is provided with a printed decorative pattern. The housing 3 is loaded with an unused photo film cassette in a state where unexposed photo film is entirely drawn from it and provisionally wound in a roll form.

The housing 3 is constituted by a main body, a front cover 3a and a rear cover 3b. The main body incorporates a shutter unit having a shutter mechanism and a photo film wind blocking mechanism. The front and rear covers 3a and 3b cover the front and rear of the main body. A winder wheel 5 projects from the rear of the housing 3. A shutter release button 6 and a transparent cover 7 having convexity are disposed on the top face of the housing 3. A front face of the housing 3 has a flash charger switch 8, a taking lens 9, an objective lens element 10 of a viewfinder, and a flash emitter window 11. There are openings formed in the cardboard belt 4 to uncover the transparent cover 7, the taking lens 9, the objective lens element 10 and the like.

A transparent plate 12 and a counter disk 13 are disposed above the shutter unit. The transparent plate 12 is produced from transparent resin. A portion of the transparent plate 12 is constituted by the transparent cover 7. The counter disk 13 is provided with a train of numbers for indicating the number of remaining unexposed frames of the photo film. The transparent plate 12 is so located as to position the counter disk 13 in its axial direction between the transparent plate 12 and the shutter unit. The transparent cover 7 is protruded upwards from the transparent plate 12, and uncovered by an opening, which is formed in a juncture between the front and rear covers 3a and 3b in the upper cover portion of the housing 3.

Figure 1B:
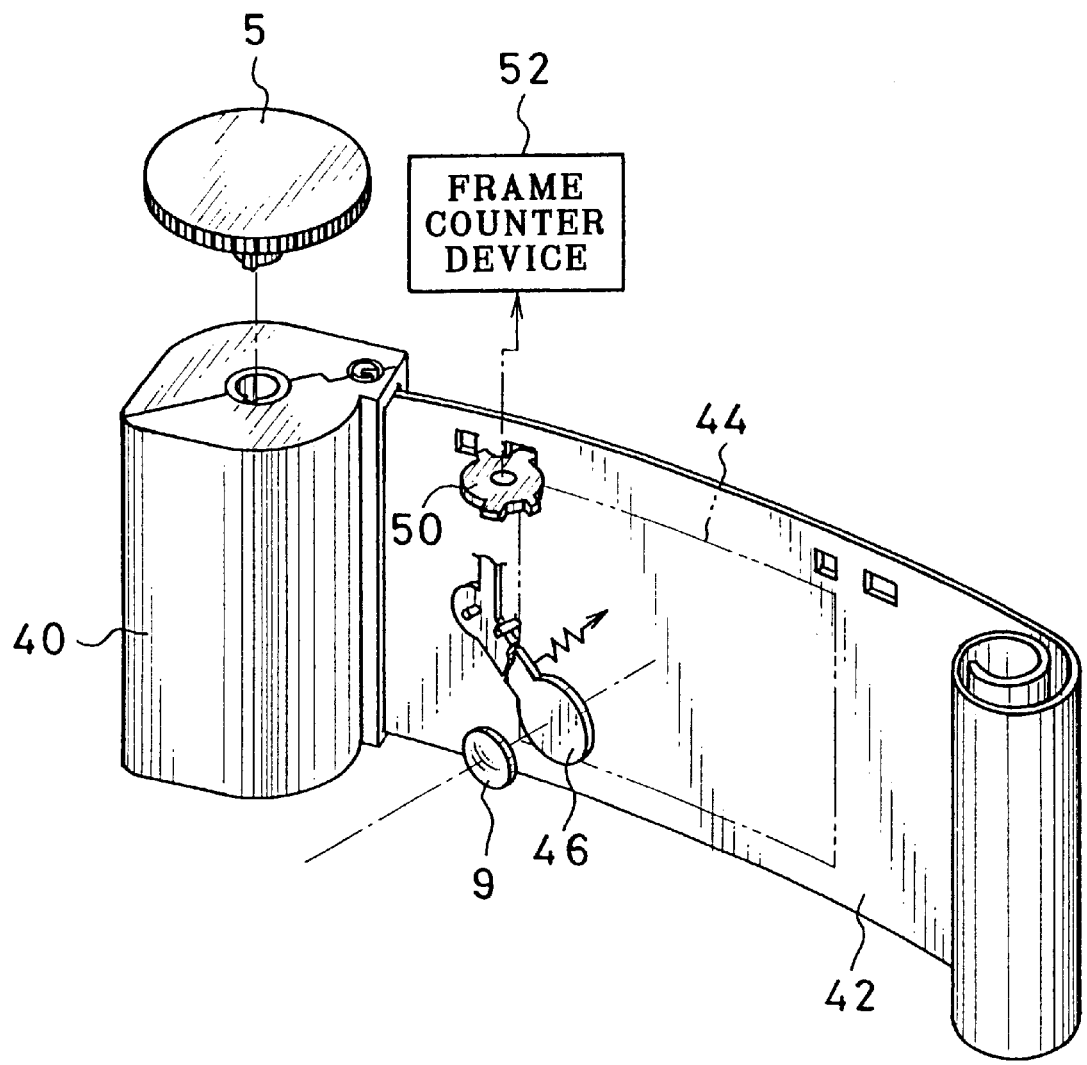
FIG. 1B is a perspective illustrating photo film, a photo film cassette, and relevant parts in the lens-fitted photo film unit.

When the winder wheel 5 is rotated by manual operation, a spool of a photo film cassette 40 in FIG. 1B is rotated with the winder wheel 5, to wind photo film 42 into the photo film cassette 40 by a length of a frame 44. In response to this, a shutter 46 is charged, and winding of the photo film 42 is blocked. The counter disk 13 is rotated by one step. For the purpose of stepping, a sprocket wheel 50 is rotated by the photo film 42, to drive a frame counter device 52 including the counter disk 13.

Figure 2:
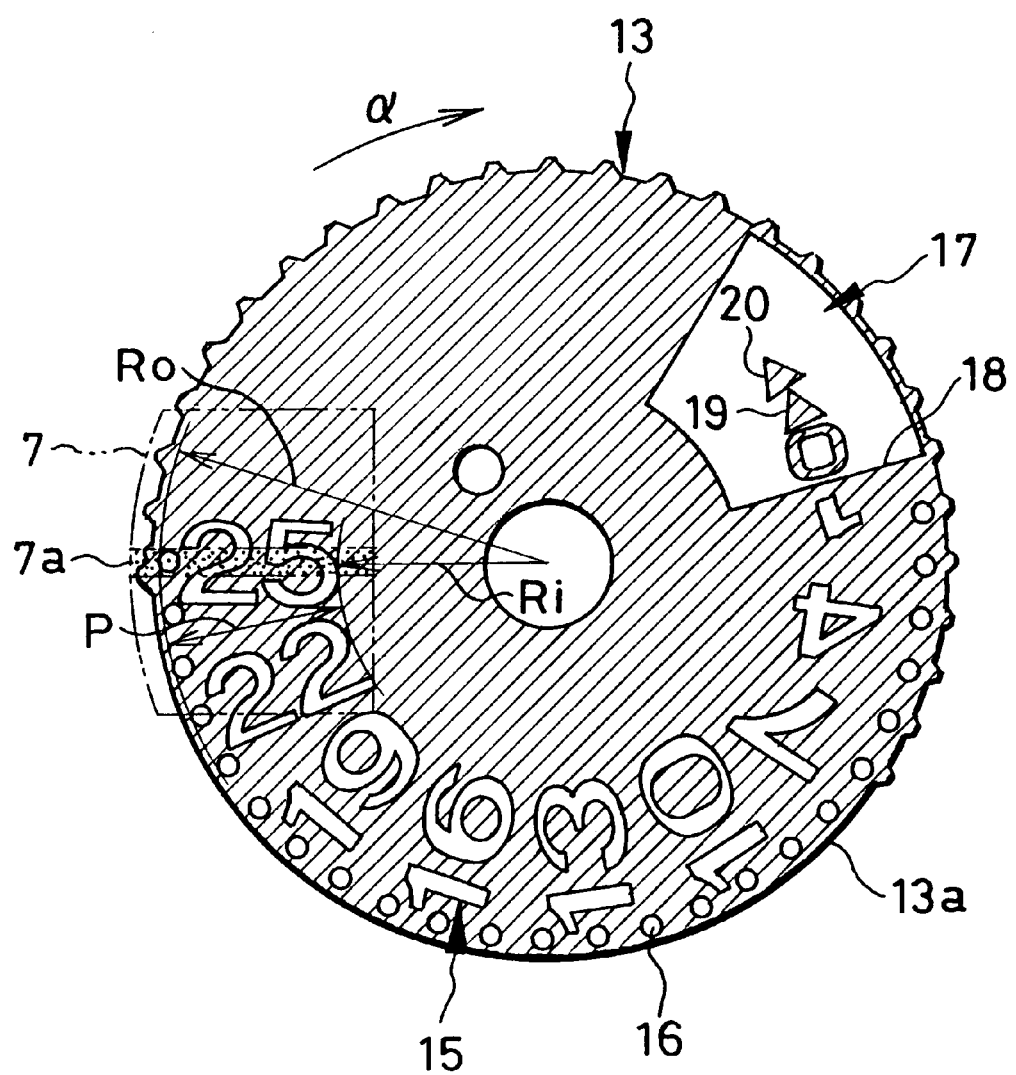
FIG. 2 is a plan illustrating a counter disk.

In FIG. 2, a peripheral edge 13a is defined about the counter disk 13. A number train 15, a dot train 16 and a finish-indicating sector region 17 are disposed on a top face of the counter disk 13. The number train 15 is arranged along the peripheral edge 13a, and consists of numbers of one (1) to 25 serially at a regular difference of three (3), in consideration of 25 available frames of the lens-fitted photo film unit 2. The dot train 16 includes 24 circular dots, of which the number is according to that of the available frames. The sector region 17 is of the white color in an inverted manner distinctly from the number train 15. The counter disk 13 is produced from resin with carbon black mixed thereto. The number train 15, the dot train 16 and the sector region 17 are all printed in the white color on the counter disk 13.

Figure 3A:
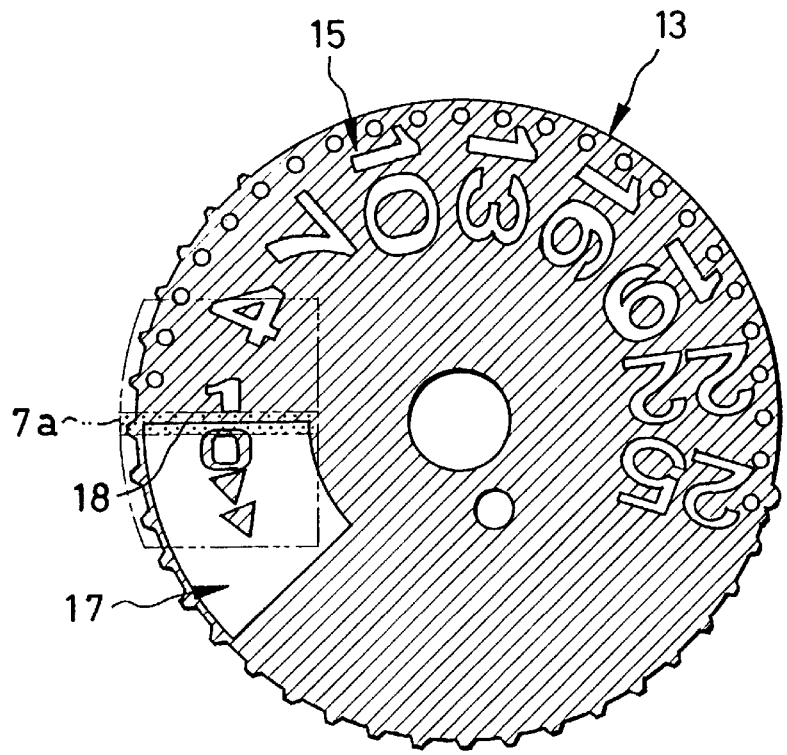
FIG. 3A is a plan illustrating the counter disk at the time when the remainder number is "1"
Figure 3B:
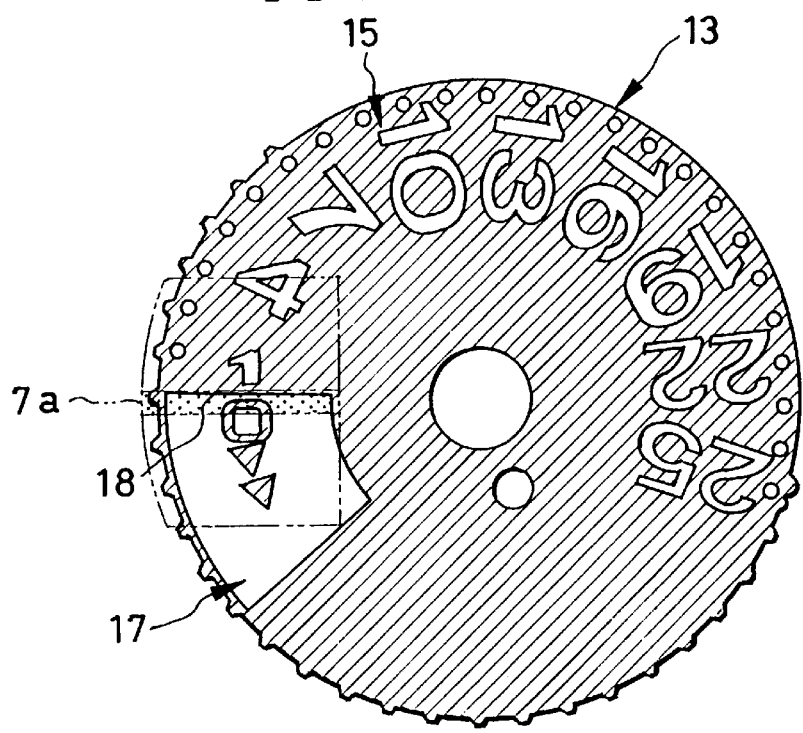
FIG. 3B is a plan illustrating the counter disk at the time immediately after that of FIG. 3A in rotation.

A borderline 18 is defined between the number train 15 and the sector region 17, and located in a position where the number "1", should have been located. In FIGS. 3A and 3B, the borderline 18 indicates completion of the exposures to all the frames 44 on the photo film 42 by providing a visually definite change in response to a small rotation of the counter disk 13 after exposing a final one of the frames 44. Thus the number "1" has a small size and disposed in the vicinity of the borderline 18. The numbers in the number train 15 from "1" to "7" gradually change in the size. The numbers from "10" to "25" have the same size. The sector region 17 has a number zero (0) for indicating no available frames on the photo film 42. Finish information 19 and 20 or triangles are formed on the sector region 17 to induce a user to rotate the winder wheel 5 continuously.

Let P designate a region of the combination of the number train 15 including the number "25" and the dot train 16. Let Ro be a maximum of the radius of the region P. Let Ri be a minimum of the radius of the region P. The radii Ro and Ri are predetermined to satisfy the following condition:

$Ri/Ro \leq 0.6$.

Note that a diameter of the counter disk 13 is 20 mm or less.

In the present embodiment, Ri/Ro=0.5 (50%). Consequently, the numbers in the number train 15 can be easily recognized by the virtue of enlargement of their size to such an extent that their figures in the final digit position do not overlap one another, with great advantages over the prior art in which Ri/Ro=0.7 (70%). It is found that, if the height of the first and second digits of the numbers is equal, the most preferable value of Ri/Ro is approximately 0.5 in view of the balance of the numerals.

Figure 4A:
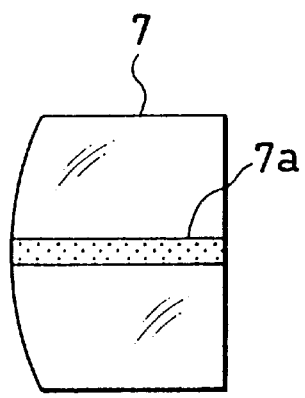
FIGS. 4A–4D are plans illustrating still other preferred pointers in a transparent cover.

In FIG. 4A, a translucent pointer line 7a is formed on the transparent cover 7 to extend crosswise to the center by forming a pattern of minute projections and/or recesses according to mat finish. The pointer line 7a points a position in the number train 15. The size of the numbers is sufficiently great. The width of the pointer line 7a is so small that only one portion of each number in the number train 15 is overlapped on the pointer line 7a. Thus the remainder number of the frames 44 on the photo film 42 can be indicated with clarity. Should a pointer be printed on a belt or box wrapped outside the housing, it is likely that such a pointer points a number offset from the correct remainder number. In the present invention, the pointer line 7a can correctly point the remainder number without such an incorrect state. Also, minute changes in the rotational angle in the counter disk 13 after exposing the final one of the frames 44 can be visible to users.

If no number is located directly under the pointer line 7a, one dot in the dot train 16 at the pointer line 7a consists information of the number of the remaining ones of the frames 44 of the photo film 42. Two dots included in the dot train 16 are regularly located between two adjacent numbers in the number train 15. For example, one dot, which is between the numbers "25" and "22" and nearer to the number "25", indicates the number "24" of the remainder. One dot, which is between the numbers "25" and "22" and nearer to the number "22", indicates the number "23" of the remainder.

The operation of the present embodiment is described now. When a user purchases the lens-fitted photo film unit 2, the number "25" is located under the pointer line 7a of the transparent cover 7 as illustrated in FIG. 2. The user can find that there are 25 available exposures with the lens-fitted photo film unit 2. The winder wheel 5 is rotated each time after one exposure is taken. The counter disk 13 is rotated in the clockwise direction a in FIG. 2. The numbers in the number train 15 and the dot train 16 serially come to lie under the pointer line 7a on the transparent cover 7, to indicate the remainder number of the frames 44 of the photo film 42.

In the number train 15 and the dot train 16, the region P satisfies $Ri/Ro \leq 0.6$. Namely, at least one portion of the number train 15 extends toward the rotational center of the counter disk 13 at the radius Ri being at most 0.6 time as long as the maximum radius Ro of the number train 15 with the dot train 16. Therefore, each number in the number train 15 can be recognized easily and quickly in spite of the small size of the counter disk 13 which is at most 20 mm across. The performance of the number train 15 is kept high even at the same time as reduction in the size of the lens-fitted photo film unit 2.

In the course of using the lens-fitted photo film unit 2, the remainder number of the frame 44 on the photo film 42 becomes one (1). In FIG. 3A, the borderline 18 becomes located at the center of the pointer line 7a in its width direction, to split the pointer line 7a in the white and black regions. The numbers zero (0) and one (1) are located in symmetrical positions with reference to the pointer line 7a. After a final exposure is taken, the winder wheel 5 is rotated. In spite of small rotation of the counter disk 13, the white sector region 17 occupies nearly all the area of the pointer line 7a as illustrated in FIG. 3B. A portion of the number zero (0) overlaps on the pointer line 7a. Thus the remainder number zero (0) of the frames 44 of the photo film 42 can be clearly indicated.

Figure 5:
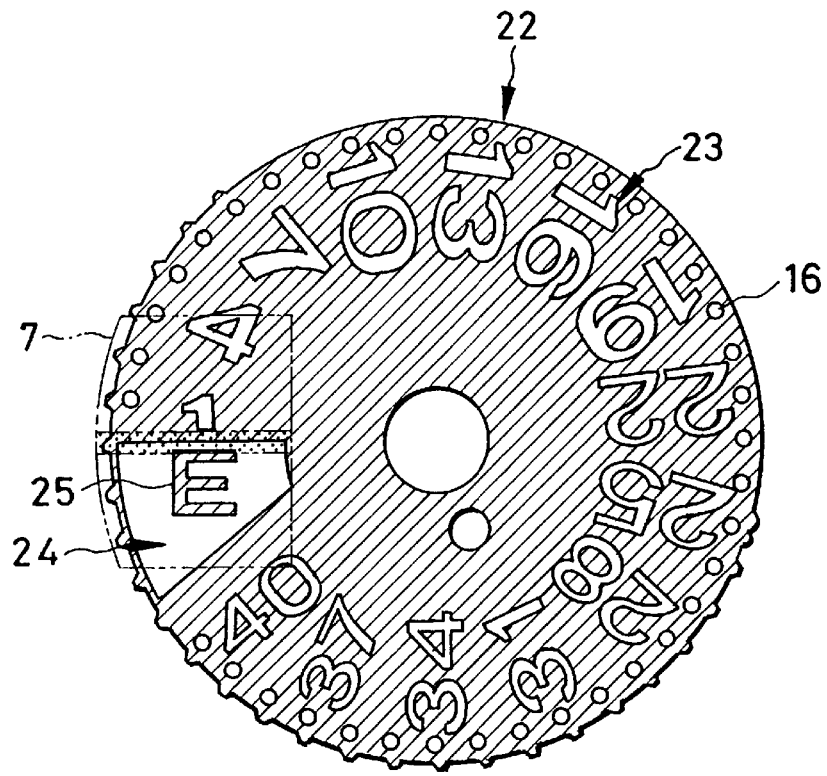
FIG. 5 is a plan illustrating a counter disk for the photo film with 40 frames.

In FIG. 5, another preferred counter disk 22 is illustrated. The counter disk 22 is constructed for the photo film 42 with a length for 40 exposures. A number train 23 consists of numbers of 1, 4, 7, . . . , 37 and 40. The dot train 16 includes 39 dots. A finish-indicating sector region 24 is provided with finish information 25 or letter E for the end, to indicate that no available frame remains on the photo film 42.

Figure 6:
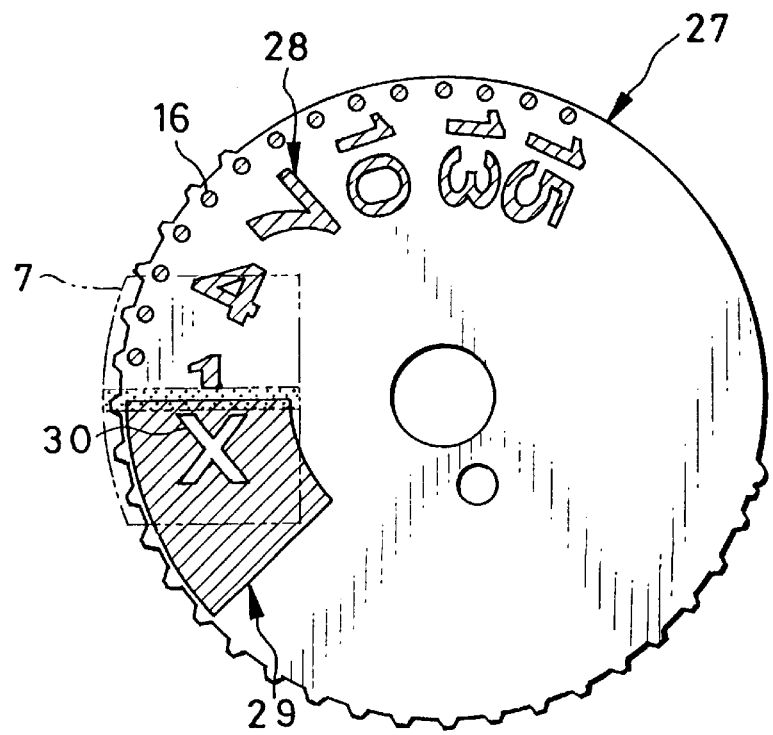
FIG. 6 is a plan illustrating a counter disk for the photo film with 15 frames.

In FIG. 6, still another preferred counter disk 27 is illustrated. The counter disk 27 is constructed for the photo film 42 with a length for 15 exposures. A number train 28 consists of numbers of 1, 4, 7, ..., 13 and 15. The dot train 16 includes 14 dots. A finish-indicating sector region 29 is provided with finish information 30 or letter X, to indicate that no available frame remains on the photo film 42. The black and white portions of the counter disk 27 are arranged in an inverted manner distinctly from the counter disk 13. Originally a disk body for the counter disk 27 is molded from resin of white color. The dot train 16, the number train 28 and the sector region 29 are printed in black color to projecting portions of the disk body, to obtain the counter disk 27.

Figure 7:
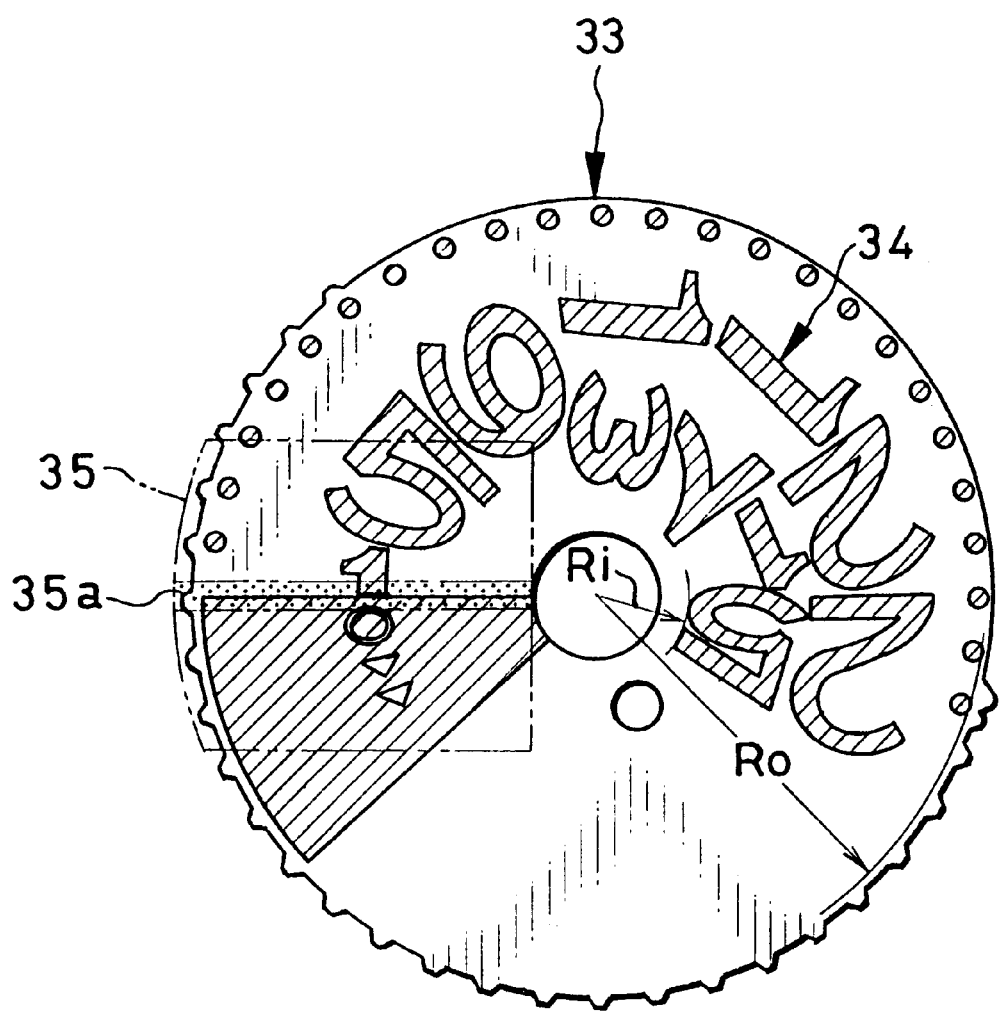
FIG. 7 is a plan illustrating another preferred counter disk having numbers of a greater size.

In FIG. 7, a counter disk 33 includes a number train 34 which satisfies Ri/Ro≦0.25. The numbers in the number train 34 are further enlarged over the above embodiments. The shapes of the numbers are deformed so as to avoid over-lapping between the adjacent numbers. A transparent cover 35 has a greater width than that of the transparent cover 7. A translucent pointer line 35a has a somewhat greater length. In the number train 34, the numbers are serial at a regular difference of four (4). Their appearance is kept good for easy recognition.

Figure 4B:
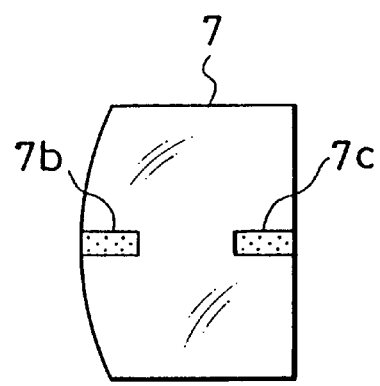
Figure 4C:
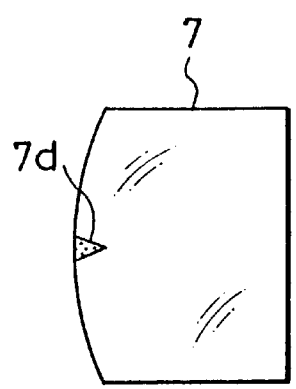
Figure 4D:
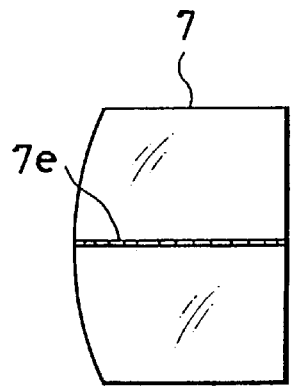

In FIG. 4A, the pointer line 7a is straight and single. Also, a pointer may be structured as illustrated in FIGS. 4B–4D. In FIG. 4B, translucent pointer dots or segments 7b and 7c are constructed by cutting the center of the pointer line 7a. In FIG. 4C, a translucent pointer dot or indicia 7d has a triangular shape with a tapered tip, which points the remainder number. In FIG. 4D, a pointer line 7e is a marked-off line.

Also, the pointer for the transparent cover may be a pointer line of any color, for example red. If the pointer line is desired to have a great width, resin with a color in a translucent manner, for example with a red color, may be used.

Furthermore, any color may be used for dye or ink for the resin of the counter disk and the printing to the projecting portions of the counter disk. Any shape of the numbers in the number train and any regular difference between the number may be used. In the above embodiment, the frame counter is used in the lens-fitted photo film unit. But the present invention can be used in a compact camera or any other mechanical instruments in which a certain value is counted.

Also, the borderline 18 may be a train of dots, a stepped shape of surface without a change in color or density, or the like.

In the above embodiments, the combination of the number train 15, 23, 34 and the dot train 16 are so shaped that the radius Ri of its innermost point is at most 60% as great as the radius Ro of the outermost point of the combination. Of course, the number train 15, 23, 34 itself can be so shaped that the radius Ri of its innermost point is at most 60% as great as the radius Ro of the outermost point of the number train.

Figure 8A:
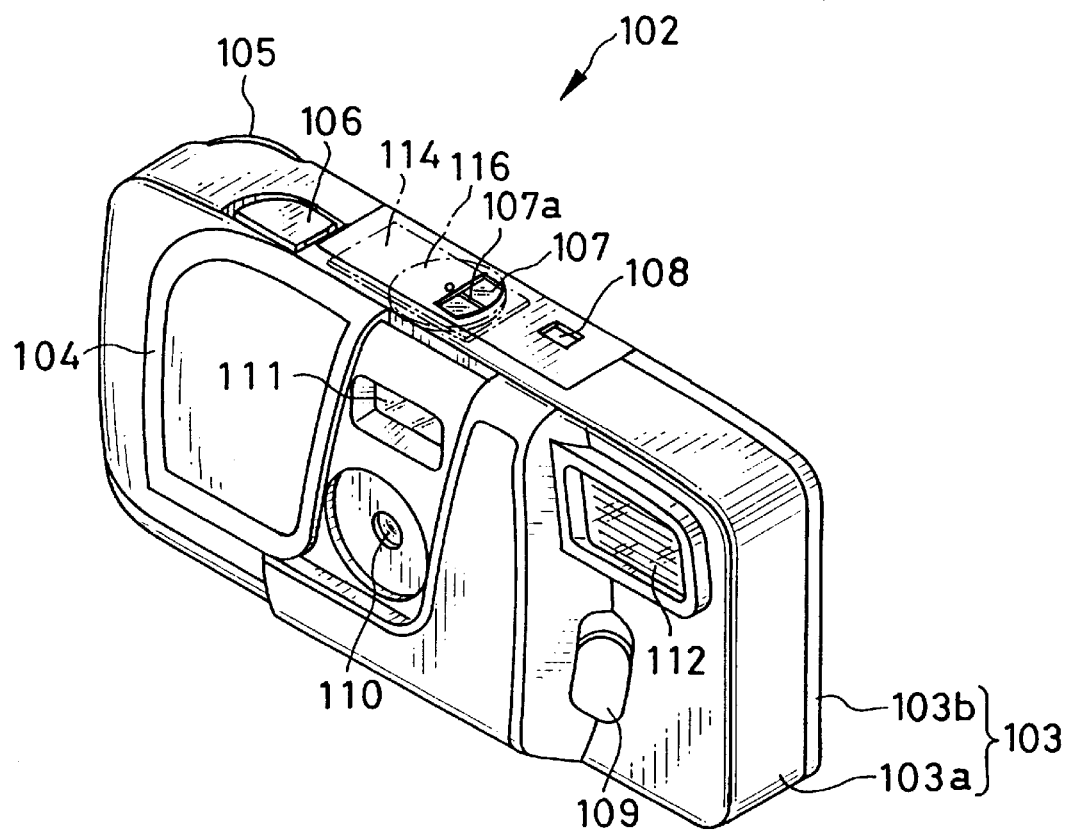
FIG. 8A is a perspective illustrating a lens-fitted photo film unit.

In FIG. 8A, a lens-fitted photo film unit 102 incorporating another preferred frame counter is depicted.

The lens-fitted photo film unit 102 has a housing 103. A lens cover 104 is disposed on the housing 103 in a slidable manner. A taking lens 110 and an objective lens 111 of a viewfinder, when not used, are covered by the lens cover 104 and protected from dust or the like. There is a linking mechanism which, when the lens cover 104 is fully open, inhibits a shutter release button 106 from being released, and inhibits a flash charger switch 109 from moving to a position for being turned on. A light guiding member 108 is movable with the flash charger switch 109. When the flash charger switch 109 is moved to its on-position, responsively the light guiding member 108 becomes protruded up from the top of the housing 103.

Figure 8B:
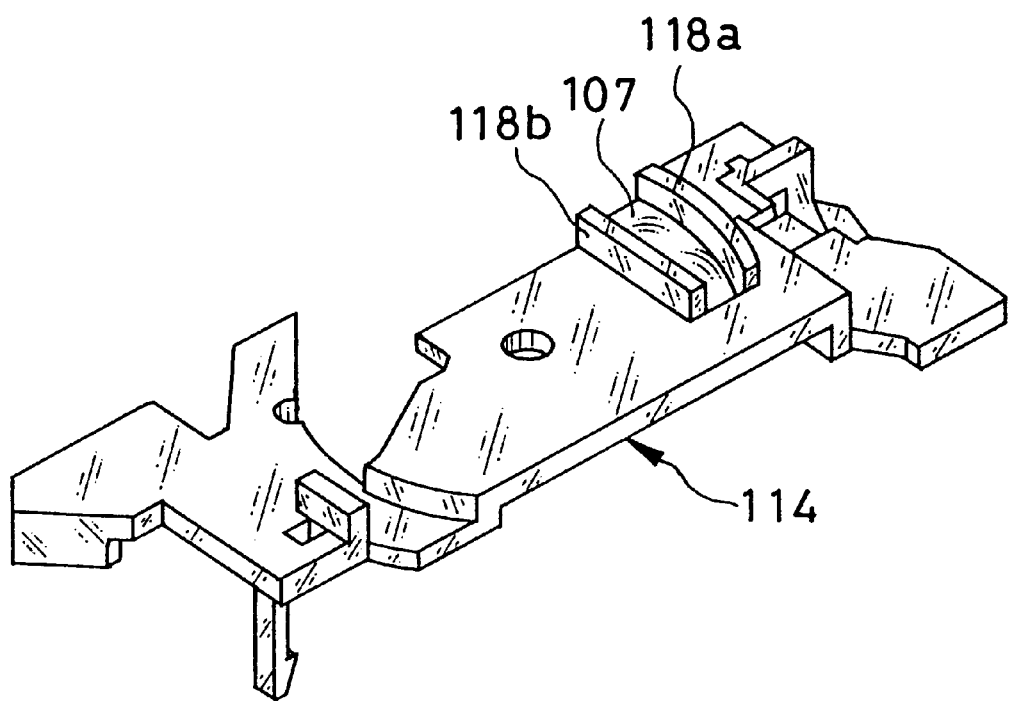
FIG. 8B is a perspective illustrating a transparent plate in the lens-fitted photo film unit.

A transparent plate 114 and a counter disk 116 are disposed under an upper cover plate of the housing 103. See FIG. 8B. The transparent plate 114 is produced from transparent resin. A portion of the transparent plate 114 is constituted by a transparent cover 107. The counter disk 116 is provided with a train of numbers for indicating the number of remaining unexposed frames of the photo film. The transparent cover 107 is provided with ridges 118a and 118b, which are fitted inside a counter window of the frame counter device. See FIG. 9C. Also, the housing 103 includes a front cover 103a, a rear cover 103b, a winder wheel 105 and a flash emitter window 112.

The transparent cover 107 renders three numbers in the number train on the counter disk 116 observable, the three numbers including the number of remaining available frames of the photo film 42, and numbers directly before and after this number. An outer portion of the transparent cover 107 is a convex lens portion, which enlarges an image of the remainder number at the center of the transparent cover 107. The preceding and succeeding numbers with the remainder number enable a user to recognize the rotating direction of the counter disk 116, and makes him or her aware that the numbers in the transparent cover 107 relate to the remaining frames on the photo film 42.

Figure 9A:
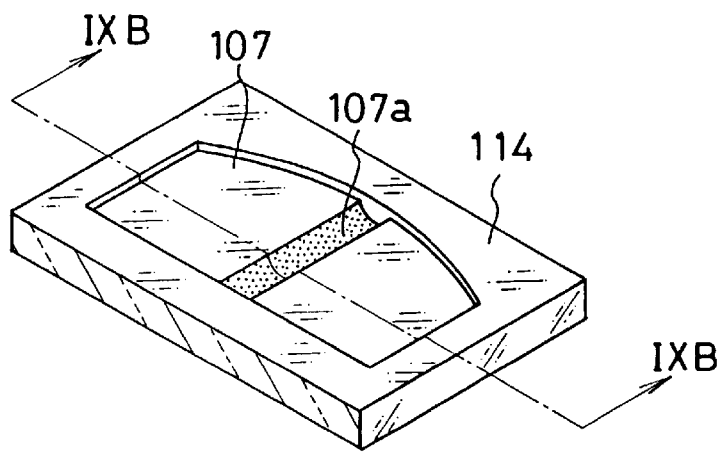
FIG. 9A is a bottom perspective, partially cutaway, illustrating a transparent cover.
Figure 9B:
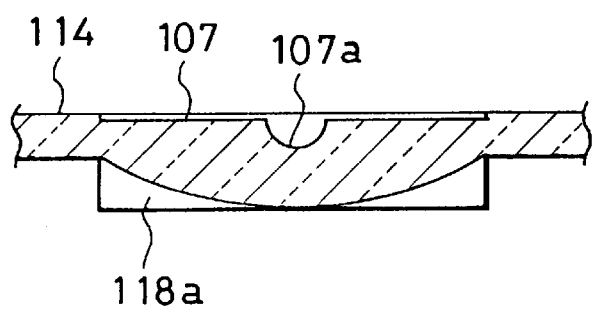
FIG. 9B is a vertical section taken on line IXB—IXB in FIG. 9A, partially cutaway, illustrating the transparent cover.
Figure 9C:
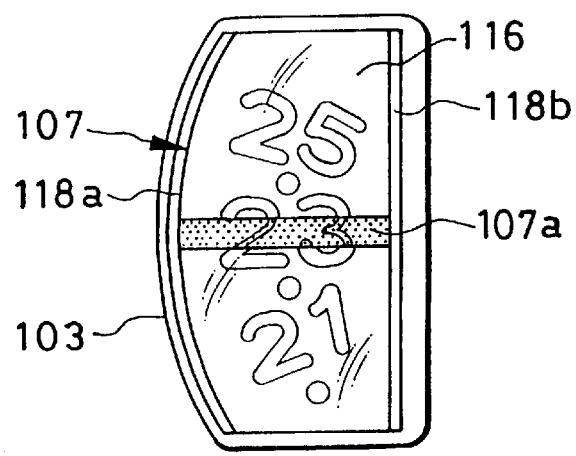
FIG. 9C is a plan illustrating a combination of a counter disk and the transparent cover.

In FIG. 9A, the transparent cover 107 and the counter disk 116 are viewed from the bottom. In FIG. 9C, the transparent cover 107 and the counter disk 116 are viewed from the top. A pointer groove or cutout 107a is formed in the transparent cover 107 at its center, and positioned above the remainder number to be indicated. In FIG. 9C, the number "23", is pointed in a manner distinct from the numbers "22" and "24".

The pointer groove 107a extends in a radial direction of the counter disk 116, and has a curved surface concave in a position above the numbers. In FIG. 9B, the pointer groove 107a has a U-shape as viewed in the cross section. A partial image observable through the pointer groove 107a has a relatively small width by operation of the pointer groove 107a as a concave lens element. It is possible to recognize the remainder number without confusion with the preceding or succeeding number.

The pointer groove 107a can be provided with translucency easily. Should a pointer be formed on a plane surface, a surface area of the pointer is smaller than that of the pointer groove 107a with the curved surface, assuming an equal width. The enlarged surface area of the pointer groove 107a makes it easy to use the mat finish in the manufacture, to roughen the surface of the pointer groove 107a, and to facilitate the forming of the pointer groove 107a with translucency. Of course the translucent appearance is effective in clarify the remainder number to the user.

Figure 10A:
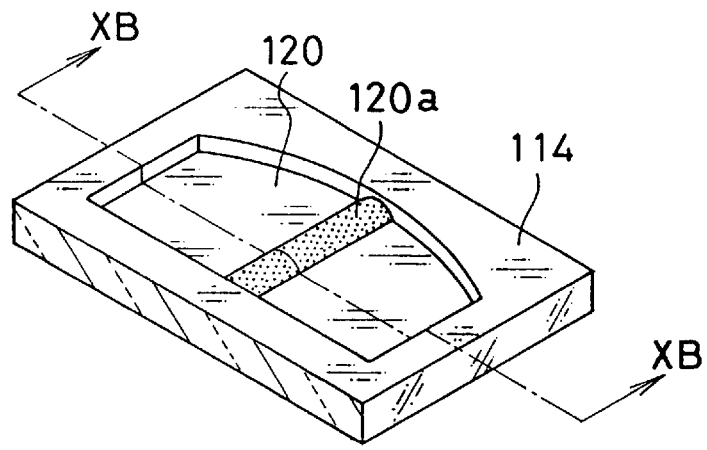
FIGS. 10A–10C are a bottom perspective, partially cutaway, a vertical section, partially cutaway, and a plan, illustrating a combination of the counter disk and another preferred transparent cover with a pointer projection.
Figure 10B:
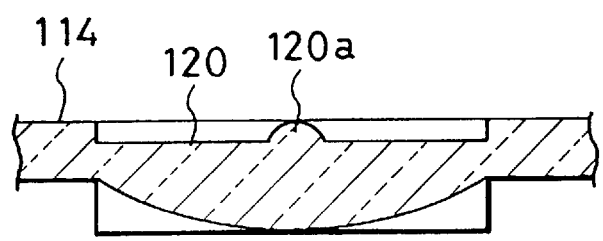
Figure 10C:
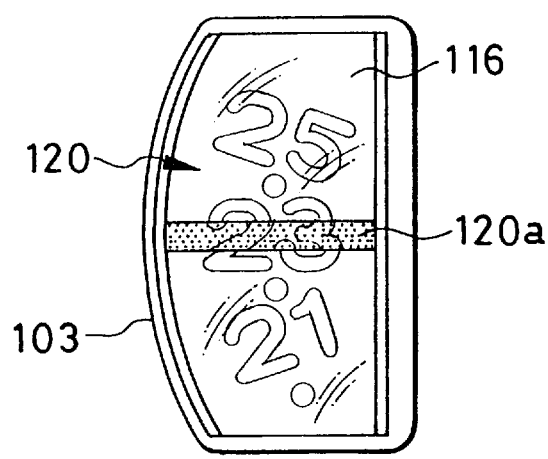

In FIGS. 10A–10C, another preferred transparent cover 120 is depicted. Elements similar to those of the above embodiments are designated with identical reference numerals. In FIG. 10A, an inner face of the transparent cover 120 is viewed. Unlike the above embodiment, a pointer projection 120a of the transparent cover 120 has a convex curved surface. In FIG. 10B, the pointer projection 120a has a U-shape as viewed in the cross section. The pointer projection 120a is in a position above the numbers. A partial image observable through the pointer projection 120a has a relatively great width by operation of the pointer projection 120a as a convex lens element. As depicted in FIG. 10C, it is possible to recognize the remainder number without confusion with the preceding or succeeding number.

The pointer projection 120a can be provided with translucency easily for the reason of the greater surface area of the curved surface. Of course the translucent appearance is effective in clarifying the remainder number to the user.

Figure 11A:
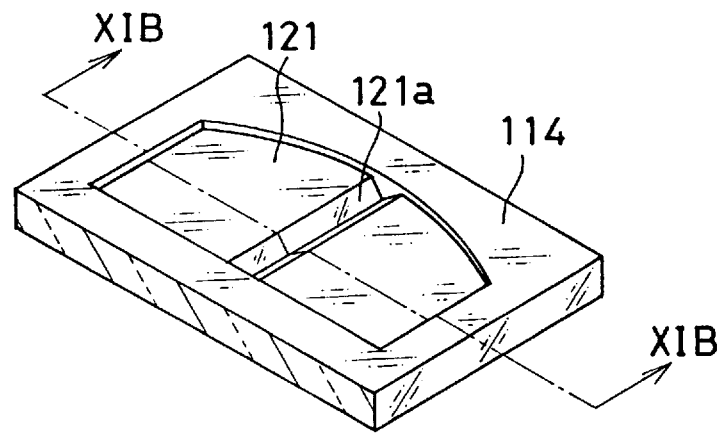
FIGS. 11A–11C are a bottom perspective, partially cutaway, a vertical section, partially cutaway, and a plan, illustrating a combination of the counter disk and another preferred transparent cover with a pointer groove.
Figure 11B:
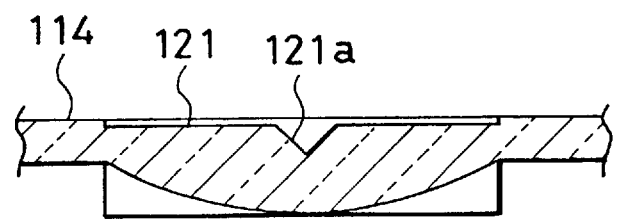
Figure 11C:
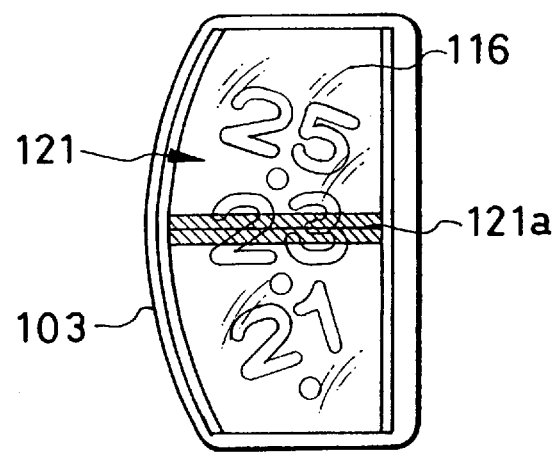

In FIGS. 11A–11C, still another preferred transparent cover 121 is depicted. Elements similar to those of the above embodiments are designated with identical reference numerals. In FIG. 11A, a pointer groove 121a is formed in an inner face of the transparent cover 121, and has a V-shape as viewed in the cross section of FIG. 11B. Inside faces of the pointer groove 121a are finished in a smooth manner.

In FIG. 11C, there occur two components of rays reflected by the pointer groove 121a. Such components are different in the direction, to lower the clarity in a partial image of the remainder number. However, this causes a position of the pointer groove 121a to have high conspicuousness. A user can find the remainder number without confusion with the preceding and succeeding numbers.

Figure 12A:
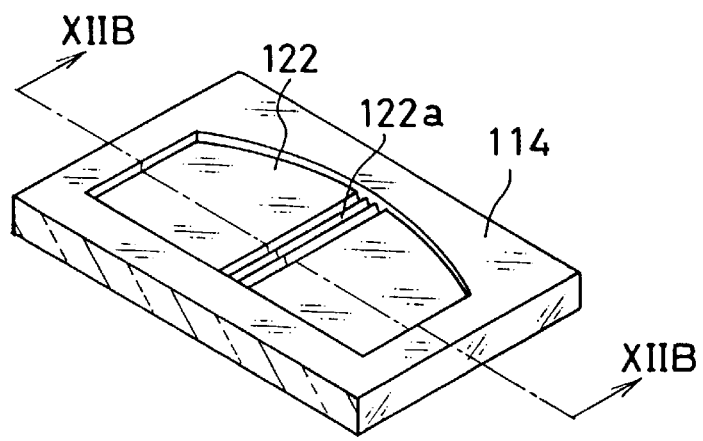
FIGS. 12A–12C are a bottom perspective, partially cutaway, a vertical section, partially cutaway, and a plan, illustrating a combination of the counter disk and another preferred transparent cover with pointer grooves.
Figure 12B:
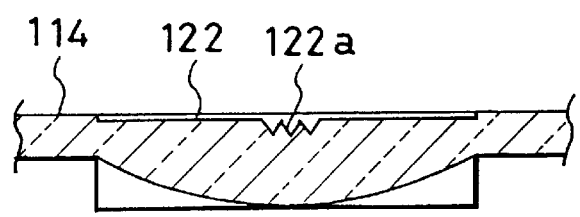
Figure 12C:
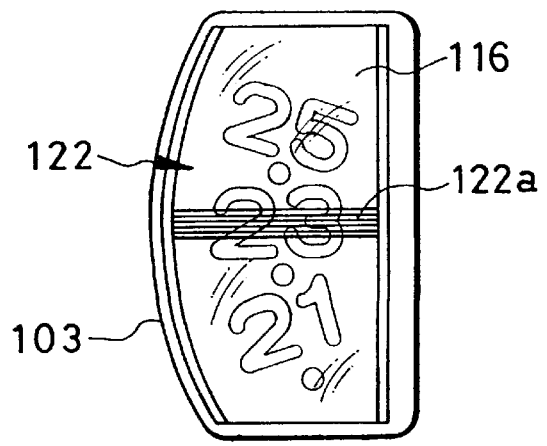

In FIGS. 12A–12C, a further preferred transparent cover 122 includes pointer grooves 122a, which are V-shaped and constitute a pattern of the pointer. There occur a number of components of rays reflected by the pointer grooves 122a. Such components are different in the direction, to lower the clarity in a partial image of the remainder number. This causes the pointer grooves 122a to have high conspicuousness. Note that the transparent cover 122 includes the three pointer grooves 122a, but may have two, or four or more pointer grooves.

Figure 13A:
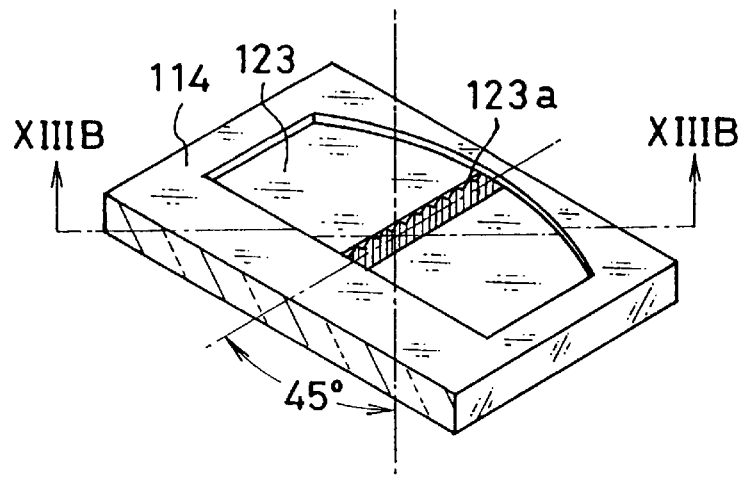
FIGS. 13A–13C are a bottom perspective, partially cutaway, a section, partially cutaway, and a plan, illustrating a combination of the counter disk and another preferred transparent cover with inclined pointer grooves.
Figure 13B:
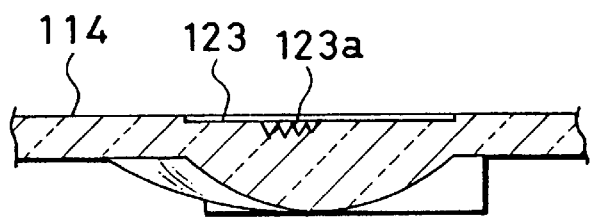
Figure 13C:
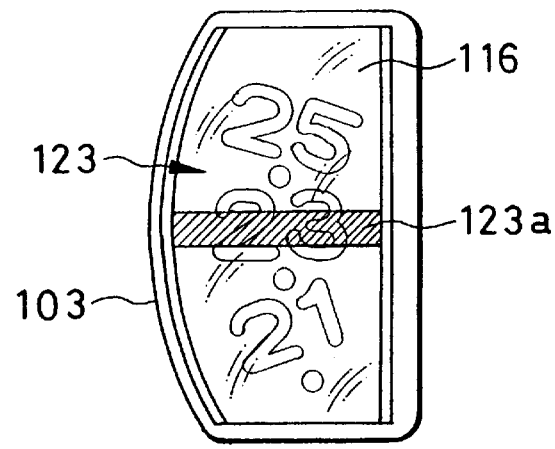

In FIG. 13A, a transparent cover 123 has a train of pointer grooves 123a arranged regularly. The train of the pointer grooves 123a extends in the radial direction of the counter disk 116. But an extending direction of each of the pointer grooves 123a is defined with an inclination of 45 degrees to the radial direction of the counter disk 116. The pointer grooves 123a are V-shaped as viewed in section, and positioned above the remainder number. See FIG. 13B. Again, there occur a number of components of rays reflected by the pointer grooves 123a. See FIG. 13C. Such components are different in the direction, to lower the clarity in a partial image of the remainder number. This causes the pointer grooves 123a to have high conspicuousness.

Figure 14A:
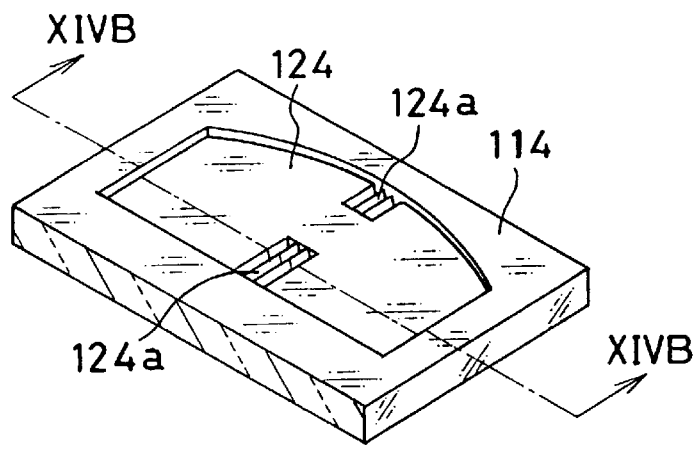
FIGS. 14A–14C are a bottom perspective, partially cutaway, a vertical section, partially cutaway, and a plan, illustrating a combination of the counter disk and another preferred transparent cover with two groups of pointer grooves.
Figure 14B:
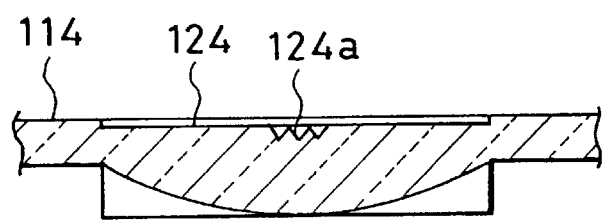
Figure 14C:
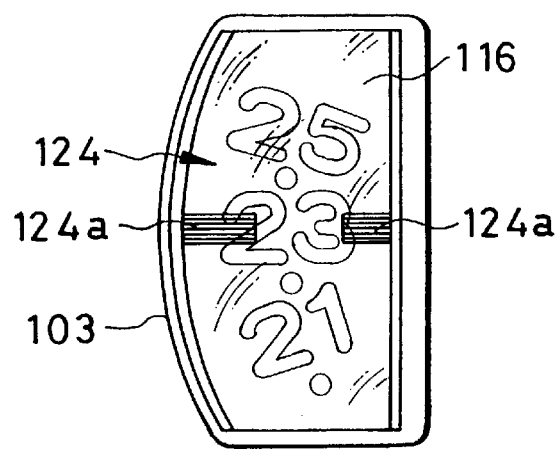

In FIGS. 14A–14C, a transparent cover 124 has first and second groups of pointer grooves 124a. The first and second groups are separate and arranged on opposite edges of the transparent cover 124. Each of the pointer grooves 124a has a V-shape as viewed in section. Note that, in spite of the present embodiment, there may be three or more groups of the pointer grooves 124a. Each of the pointer grooves 124a may has a shape different from the V-shape as viewed in section. It is possible by separating the groups of the pointer grooves 124a to enlarge the ease in the recognition of the remainder number without failure in pointing the remainder number, because the area defined by the periphery of the combination of the pointer grooves 124a is reduced in comparison with the former embodiments.

In the above embodiments, the pointer is disposed on the inner face of the transparent cover. However any of the above pointers may be disposed on an outer face of the transparent cover.

Note that the transparent cover 107, according to the above embodiments, has the outer convex lens portion, of which an example is a cylindrical lens.

In the above embodiments, the lens-fitted photo film unit includes an upper cover plate, which covers the counter disk and in which a counter window is formed. The counter window renders at least one number in the number train observable externally. In spite of this construction, the present invention may be used with a counter disk of which the entirety is uncovered on the outside of the lens-fitted photo film unit.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. The frame counter device comprising:
    a counter disk rotatable in a first direction, said counter disk rotating intermittently in said first direction at a predetermined pitch each time photo film is fed by one frame;
    a frame indication recorded on a face of said counter disk and oriented in a rotational direction of said counter disk, said frame indication being disposed in a ring-shaped region defined between first and second radii with reference to a rotational center of said counter disk, said second radius being 60% or less of said first radius, said frame indication including a train of plural numbers arranged in said first direction incrementally, each of said numbers representing an available unexposed frame number of said photo film, a majority of the numbers in the number train having a value which is greater than that of a previous number by a predetermined increment, said frame indication further including a train of plural dots arranged rotationally at an outermost peripheral position of the counter disk at a pitch equal to said predetermined pitch, the counter window exposing at least a portion of the number train and a portion of the dot train, at least one portion of said numbers being tangential to a circle defined by said second radius, and said dot train being tangential to a circle defined by said first radius; and
    a counter window, positioned above said counter disk, for allowing said frame indication partially to be externally observed, a range of said counter window being longer than a range of said frame indication with reference to a radial direction of said counter disk, the counter window comprising a magnifying lens.

2. A frame counter device as defined in claim 1, wherein said counter disk rotates intermittently in said first direction at a predetermined pitch at each time when photo film is fed by one frame.

3. A frame counter device as defined in claim 2, further comprising a counter window, positioned above said counter disk, for allowing said frame indication partially to be externally observed, a range of said counter window being longer than a range of said frame indication with reference to a radial direction of said counter disk.

4. A frame counter device as defined in claim 3, wherein said counter disk has a diameter of 20 mm or less.

5. A frame counter device as defined in claim 3, wherein said frame indication includes a train of plural numbers arranged in said first direction incrementally, each of said numbers representing an available unexposed frame number of said photo film.

6. A frame counter device as defined in claim 5, wherein said frame indication further includes a train of plural dots arranged rotationally at a pitch equal to said predetermined pitch.

7. A frame counter device as defined in claim 6, wherein at least one portion of said numbers is tangential to a circle defined by said second radius, and said dot train is tangential to a circle defined by said first radius.

8. A frame counter device as defined in claim 7, wherein said number train is in an arithmetic progression, a maximum number in said number train is a predetermined maximum available frame number of said photo film, and a minimum number in said number train is a number 1.

9. A frame counter device as defined in claim 8, further comprising:
    a transparent cover disposed to close said counter window; and
    a pointer, disposed on said transparent cover, for pointing one of said numbers in said number train.

10. A frame counter device as defined in claim 9, wherein said frame counter device is incorporated in a lens-fitted photo film unit, said lens-fitted photo film unit includes an upper cover plate, said upper cover plate covers said counter disk and has said counter window formed therein.

11. A frame counter device as defined in claim 10, wherein said numbers are arranged at a pitch which is an integer number of times as great as said predetermined pitch, the frame counter device further comprising:

finish information, indicated in said sector region, for representing lack of unexposed frames on said photo film.

12. A frame counter device as defined in claim 11, wherein said finish information includes a number 0.

13. A frame counter device as defined in claim 12, wherein said number 1 is smaller in a size than remaining numbers in said number train.

14. A frame counter device as defined in claim 10, wherein said pointer is a line.

15. A frame counter device as defined in claim 10, wherein said pointer is at least one indicia.

16. A frame counter device comprising:

a counter disk rotatable in a first direction at a predetermined pitch for each advancement of the photo film by one frame;

a frame indication disposed on a face of the counter disk comprising a train of plural numbers arranged incrementally in the first direction;

a counter window positioned above the counter disk to expose a portion of the frame indication;

a transparent cover disposed near the counter window;

a pointer disposed on the transparent cover so as to point to one of the numbers in the number train;

wherein said pointer is a portion of the transparent cover having a translucent matte finish.

17. A frame counter device for indicating an available unexposed frame number, comprising:

a counter disk rotatable in a first direction in an intermittently at a predetermined pitch;

a train of plural numbers arranged in said first direction incrementally, each of said numbers representing said available unexposed frame number, wherein said number train includes a number 1, said numbers are arranged at a pitch which is an integer number of times as great as said predetermined pitch, and said number 1 is offset from a home position in said first direction;

a sector region, having an end disposed in said home position, extending in a second direction reverse to said first direction, said sector region being different in density or color from a remaining region of said counter disk different from said sector region; and finish information, indicated in said sector region, for representing lack of unexposed frames, said finish information being different in density or color from said sector region.

18. A frame counter device as defined in claim 17, wherein said sector region has density or color of said number train, and said finish information has density or color of said remaining region.

19. A frame counter device as defined in claim 17, wherein said counter disk has a diameter of 20 mm or less.

20. A frame counter device as defined in claim 17, further comprising:

a counter window positioned above said counter disk, said number train moved past said counter window when said counter disk rotates intermittently in said first direction at said predetermined pitch;

a transparent cover disposed to close said counter window; and a pointer, disposed on said transparent cover, for pointing one of said numbers in said number train.

21. A frame counter device as defined in claim 20, wherein said number 1 is smaller in a size than remaining numbers in said number train.

22. A frame counter device as defined in claim 20, wherein said pointer is finished translucently by mat finish of a portion of the transparent cover.

23. A frame counter device as defined in claim 20, wherein said pointer is a line.

24. A frame counter device for counting a frame number, comprising:

a counter disk for rotating in a first direction at one pitch when photo film is wound by one frame, having a train of plural numbers arranged in an arc shape;

a counter window for allowing three adjacent numbers in said number train to be externally observed;

a transparent cover disposed to close said counter window; and a pointer cutout or pointer projection, disposed on said transparent cover, positioned substantially at a center of said counter window, shaped with a curve as viewed in section, for pointing one of numbers in said number train observable in said counter window.

25. A frame counter device as defined in claim 24, wherein said frame counter device is incorporated in a lens-fitted photo film unit, said numbers are arranged in said first direction incrementally, each of said numbers representing an available unexposed frame number of said photo film.

26. A frame counter device as defined in claim 24, wherein said pointer cutout or pointer projection has a rough surface.

27. A frame counter device as defined in claim 24, wherein said transparent cover has outer and inner faces, said inner face being positioned at said counter disk, said pointer cutout or pointer projection being disposed on said inner face;

said transparent cover includes a convex lens portion, formed to protrude on said outer face, for enlarging said number train.

28. A frame counter device for counting a frame number, comprising:

a counter disk for rotating in a first direction at one pitch when photo film is wound by one frame, having a train of plural numbers arranged in an arc shape;

a counter window for allowing three adjacent numbers in said number train to be externally observed;

a transparent cover disposed to close said counter window; and at least one pointer groove, disposed on said transparent cover, positioned substantially at a center of said counter window, having a V-shape as viewed in section, for pointing one of numbers in said number train observable in said counter window.

29. A frame counter device as defined in claim 28, wherein said transparent cover has outer and inner faces, said inner face being positioned at said counter disk, said at least one pointer groove being formed in said inner face;

said transparent cover includes a convex lens portion, formed to protrude on said outer face, for enlarging said number train.

30. A frame counter device as defined in claim 28, wherein said at least one pointer groove includes a train of plural pointer grooves substantially parallel with one another, said groove train of said pointer grooves extending crosswise to said number train, and said pointer grooves being inclined with reference to extension of said groove train.

31. A frame counter device as defined in claim 28, wherein said at least one pointer groove includes at least two pointer grooves arranged away from one another, and crosswise to said number train.

32. A frame counter device comprising:

a counter disk rotatable in a first direction; and a frame indication recorded on a face of said counter disk and oriented in a rotational direction of said counter disk, the frame indication comprising a train of plural numbers arranged incrementally in the first direction, the train of numbers including a number 1 offset from a home position in said first direction, said frame indication being disposed in a ring-shaped region defined between first and second radii with reference to a rotational center of said counter disk;

a sector region defined by and between arcs having said first and second radii, said sector region having an end disposed in said home position, extending in a second direction reverse to said first direction, said sector region being different in density or color from a surrounding region of said counter disk.

* * * * *